US012617959B2

(12) United States Patent
Bethouart

(10) Patent No.: US 12,617,959 B2
(45) Date of Patent: *May 5, 2026

(54) PEELABLE INK COMPOSITION FOR NON-POROUS SUBSTRATES

(71) Applicant: SOCIÉTÉ BIC, Clichy Cedex (FR)

(72) Inventor: Carine Bethouart, Clichy Cedex (FR)

(73) Assignee: SOCIÉTÉ BIC, Clichy Cedex (FR)

( * ) Notice: Subject to any disclaimer, the term of this patent is extended or adjusted under 35 U.S.C. 154(b) by 774 days.

This patent is subject to a terminal disclaimer.

(21) Appl. No.: 17/907,440

(22) PCT Filed: Mar. 26, 2021

(86) PCT No.: PCT/EP2021/057953
§ 371 (c)(1),
(2) Date: Sep. 27, 2022

(87) PCT Pub. No.: WO2021/198076
PCT Pub. Date: Oct. 7, 2021

(65) Prior Publication Data
US 2023/0105735 A1 Apr. 6, 2023

(30) Foreign Application Priority Data

Mar. 31, 2020 (EP) .................................... 20167380

(51) Int. Cl.
*C09D 11/106* (2014.01)
*C09D 11/17* (2014.01)
(52) U.S. Cl.
CPC ............ *C09D 11/17* (2013.01); *C09D 11/106* (2013.01)
(58) Field of Classification Search
CPC ........ C09D 11/16; C09D 11/17; C09D 11/106
See application file for complete search history.

(56) References Cited

U.S. PATENT DOCUMENTS

| 10,438,752 B2 * | 10/2019 | Buffry | ..................... H01G 11/48 |
| 2005/0215678 A1 * | 9/2005 | Ludtke | ..................... C08K 5/52 |
| | | | 524/127 |

FOREIGN PATENT DOCUMENTS

| CN | 101451037 B | * | 7/2011 | ............. C09D 11/17 |
| EP | 0556668 A1 | | 8/1993 | |
| EP | 2150594 B1 | | 2/2011 | |
| JP | H08199104 A | * | 8/1996 | ............. C09D 11/02 |
| JP | 2003221542 A | | 8/2003 | |
| JP | 2006022213 A | | 1/2006 | |
| JP | 2017210551 A | | 11/2017 | |

OTHER PUBLICATIONS

JPH08199104A English (Year: 1996).*
CN101451037B English (Year: 2011).*
International Search Report issued in International Application PCT/EP2021/057953 on Jun. 17, 2021 (2 pages).

* cited by examiner

*Primary Examiner* — Catherine S Branch
*Assistant Examiner* — Huihong Qiao
(74) *Attorney, Agent, or Firm* — Bookoff McAndrews, PLLC

(57) ABSTRACT

An aqueous peelable ink composition substrate comprising: (a) at least one film-forming elastomeric polymer, (b) at least one anionic surfactant, (c) at least one coloring agent, and (d) water, wherein the film-forming elastomeric polymer is acrylonitrile butadiene rubber (NBR) and/or hydrogenated acrylonitrile butadiene rubber (HNBR), and a method for preparing such an aqueous peelable ink composition.

20 Claims, No Drawings

PEELABLE INK COMPOSITION FOR NON-POROUS SUBSTRATES

CROSS REFERENCE TO RELATED APPLICATION

This application is a National Stage Application of International Application No. PCT/EP2021/057953, filed on Mar. 26, 2021, now published as WO2021198076 and which claims priority from European Application No. EP20167380.3, filed on Mar. 31, 2020.

TECHNICAL FIELD

The present disclosure concerns an aqueous peelable ink composition, more specifically a writing ink composition, in particular for non-porous substrates. The disclosure also concerns a method for preparing such an aqueous peelable ink composition. A writing instrument comprising such an aqueous peelable ink composition and a method for writing on a substrate, in particular a non-porous substrate, are also part of the disclosure. The disclosure also concerns a film obtained by drying an ink composition according to the disclosure, and to a method for obtaining such a film. Finally, the disclosure concerns a substrate, in particular a non-porous substrate, coated with an aqueous peelable ink composition or a film according to the disclosure. The aqueous peelable ink composition of the disclosure includes a film-forming elastomeric polymer, an anionic surfactant, as well as a coloring agent dispersed in water. When the ink composition is applied to substrates, more specifically a non-porous substrate, the water evaporates and the polymer provides a coalesced film (also named residue or deposit) on the surface of the substrate. The ink composition is peelable in that the film can be removed from the surface of the substrate, preferably such as glass, metals, and polymer materials, for some period of time after formation without leaving a visible residue or damaging the substrate. Hence, the written mark on a substrate can be removed by peeling (or rubbing) with an eraser to peel the color of the written mark, in particular just after writing. The ink composition of the disclosure is particularly suitable for use with writing surfaces, in particular a non-porous substrate (also named non-porous substrates) such as glass, metals, and polymer materials. The aqueous peelable ink composition of the disclosure is also storage-stable, easy to manufacture, and easy to apply.

The ink composition of the disclosure preferably has a low viscosity, preferably a viscosity ranging from 3 to 10 mPa·s, more preferably ranging from 3 to 7 mPa·s, and as a result is particularly suitable for use with standard felt-tip markers that rely on a capillary feed system to draw ink from a reservoir. Thus, the ink composition of the disclosure is particularly suitable for use in markers which typically use colored pigments.

BACKGROUND

Aqueous erasable writing ink compositions are known in the art such as in JP2003221542 or JP2006022213. Said aqueous ink compositions are based on film-forming polymers and contain colorant. However, with this kind of erasable writing ink compositions, erasability may be difficult after a long period of time, and is thus sometimes not satisfactory.

Therefore, there is a need to find a new aqueous erasable ink composition, more specifically a writing ink composition, in particular for non-porous substrates, providing a good deposit as well as a good erasability (peelability). In particular, a good deposit should be understood as good wettability (quality of the deposit) and/or high color opacity and/or vividness. In addition, according to some embodiment, it is advantageous to avoid ink leakage phenomenon in particular during use, or if exposed to a temperature of 37° C. to 50° C. for example, or if a shock occurs on the writing instrument containing the ink.

SUMMARY

The inventors have surprisingly found that the use of a specific film-forming elastomeric polymer such as acrylonitrile butadiene rubber (NBR) and/or hydrogenated acrylonitrile butadiene rubber (HNBR), in combination with an anionic surfactant and a coloring agent dispersed in water, can lead to an ink composition which solves the above-mentioned problems and which exhibits the aforementioned advantages. The peelable ink composition of the disclosure also presents the advantage of being peelable (and therefore erasable), in particular with an eraser and/or with a tissue and/or with fingers, thus resulting of less waste than with conventional erasers.

DETAILED DESCRIPTION

Hereinafter, a detailed description of the present disclosure will be given. The specific embodiments are meant better illustrate the present disclosure, however, it should be understood that the present disclosure is not limited to these specific embodiments.

In the sense of the present disclosure, the expression "comprising a" should be understood as being synonymous with "comprising at least one".

In the sense of the present disclosure, the expressions "between . . . and . . . " or "ranging from . . . to . . . " should be understood as including the values of the limits.

For the purposes of the present disclosure, the term "erasable ink" or "peelable ink" is intended to mean any ink which can be peeled (or rubbed) after writing, preferably by the use of a finger or a friction body wherein the friction body can be an eraser or a tissue. The written mark made, in particular on glass, metals which may be pre-treated or not, polymer materials, by this ink can therefore be peeled just after writing such as less than 10 seconds after writing, even a few days after writing, and also even one month after writing.

The ink composition according to the present disclosure is advantageously irreversibly peeled. It is therefore an irreversible peelable ink composition.

The ink composition according to the present disclosure is more specifically a writing ink. For the purposes of the present disclosure, the term "writing ink" is intended to mean any ink which is intended to be used in a writing instrument, and in particular in a marker. A writing ink should not be confused with a printing ink which is used in printing machines and which does not have the same technical constraints, and thus the same specifications. Indeed, a writing ink must not contain solid particles of which the size is greater than the channels of the writing instrument, in order to avoid blocking them, which would inevitably lead to writing being irreversibly stopped. It must also dry sufficiently rapidly to avoid smudging the writing medium. It must also avoid the problems of migration (bleeding) over time. Thus, the ink composition according to the present disclosure will be suitable for the writing instrument for which it is intended.

In a first aspect, the present disclosure relates to an aqueous peelable ink composition comprising:
   (a) at least one film-forming elastomeric polymer,
   (b) at least one anionic surfactant,
   (c) at least one coloring agent, and
   (d) water,
wherein the film-forming elastomeric polymer (a) is acrylonitrile butadiene rubber (NBR) and/or hydrogenated acrylonitrile butadiene rubber (HNBR).

The aqueous peelable ink composition of the disclosure presents the advantages of providing a good deposit, as well as a good erasability (peelability) by mechanical action and/or enable to avoid ink leakage phenomenon.

In particular, a good deposit should be understood as a good wettability (quality of the deposit) and/or high color opacity and/or vividness.

In particular, a good wettability (quality of the deposit) should be understood as a deposit (written mark) which is homogeneous and/or uniform and/or non-shrinkable after applying it, in particular on a non-porous substrate.

The film-forming elastomeric polymer (a) allows the fixation of the ink composition of the disclosure on the substrate, in particular the non-porous substrate, and therefore avoids the written mark (deposit) of the ink to be peeled (i.e. removed) by simply brushing it while being erasable by peeling with a friction body.

In the sense of the disclosure, "film-forming" means a polymer capable of forming by itself a macroscopically continuous film on a substrate, in particular on a non-porous substrate, and preferably a cohesive film.

In the sense of the disclosure, "elastomeric" means a polymer that displays rubber-like elasticity, i.e. a deformable, flexible polymer which has viscoelastic properties.

In the sense of the disclosure, a "polymer" is a compound (in particular a large molecule or a macromolecule) corresponding to the repetition of one or more units (these units being derived from compounds named monomers), and in particular the repetition of at least two repeating units, and preferably at least ten repeating units.

The film-forming elastomeric polymer (a) of the disclosure is acrylonitrile butadiene rubber (NBR), for example commercially available under the name Nipol® LX531B (Zeon Corporation), Europrene® (Versalis), Krynac® (Brenntag), and/or hydrogenated acrylonitrile butadiene rubber (HNBR), for example commercially available under the name Zetpol® 2230LX (Zeon Corporation), Therban® (Brenntag), as well as mixtures thereof. In a preferred embodiment, the film-forming elastomeric polymer (a) is hydrogenated acrylonitrile butadiene rubber (HNBR).

Advantageously, the film-forming elastomeric polymer (a) represents at least 8% by weight, preferably at least 12% by weight, more preferably at least 16% by weight, and even more preferably at least 20% by weight, relative to the total weight of the ink composition. More specifically, the content of film-forming elastomeric polymer (a) ranges from 8 to 36% by weight, preferably from 12 to 32% by weight, more preferably from 16 to 32% by weight, and even more preferably from 20 to 32% by weight, relative to the total weight of the ink composition.

The aqueous peelable ink composition of the disclosure also comprises at least one anionic surfactant (b) as wetting agent. In fact, the anionic surfactant (b) surprisingly allows decreasing the surface tension of the ink composition, and therefore improves the wettability of the ink, in particular on the non-porous substrate. The term "wettability" depends on both the physical and chemical characteristics of the substrate. If a liquid spreads completely across the surface of a substrate and forms a film, the contact angle is close to 0°. If the liquid beads on the surface of a substrate, the surface of the substrate is considered to be non-wettable by this specific liquid.

Advantageously, the anionic surfactant (b) of the disclosure is a salt of fatty acid esters and/or of sulfonic acid and/or of phosphoric acid, preferably of phosphoric acid and/or of a sulfonic acid derivative of carboxylic acid. In a preferred embodiment, the anionic surfactant is an alkali metal salt, preferably a sodium or potassium salt.

Advantageously, the anionic surfactant (b) of the disclosure is a salt of fatty acid esters and/or of sulfonic acid, preferably a sulfonic acid derivative of carboxylic acid. In a preferred embodiment, the anionic surfactant is an alkali metal salt, preferably a sodium or potassium salt. In another embodiment, the anionic surfactant is a salt of fatty acid esters and/or of sulfonic acid, preferably a sulfonic acid derivative of carboxylic fatty acid esters, wherein the anionic surfactant is preferably in $C_4$-$C_{30}$, more preferably in $C_5$-$C_{28}$, and even more preferably in $C_5$-$C_{25}$. Preferably, the fatty acid esters are mono- and/or di-fatty acid esters in $C_4$-$C_{30}$, more preferably in $C_5$-$C_{28}$, and even more preferably in $C_5$-$C_{25}$. Preferably the sulfonic acid is $RSO_3H$ wherein R is a hydrocarbon chain, preferably a mono- or di-fatty acid ester chain, more preferably in $C_4$-$C_{30}$, and even more preferably in $C_5$-$C_{28}$. In a preferred embodiment, the anionic surfactant is a sodium or potassium salt of mono- and/or di-fatty acid esters and/or of sulfonic acid, in $C_4$-$C_{30}$, and preferably in $C_5$-$C_{28}$. In a preferred embodiment, the anionic surfactant is a salt of sulfonic acid derivative of carboxylic fatty acid esters, preferably an alkali metal salt. In a particularly preferred embodiment, the anionic surfactant (b) is an alkali metal salt of 1,4-diisodecyl sulphonato-succinate, preferably sodium 1,4-diisodecyl sulphonatosuccinate.

More specifically, the anionic surfactant is a salt of a phosphoric acid i.e a phosphate salt, more specifically an alkyl phosphate salt, even more specifically an alkali metal salt, preferably a sodium or potassium salt.

More specifically, the alkyl phosphate salt is a mono- or polysubstituted phosphoric acid by alkyl alcohol, in particular by a mono- or polyethylene glycol alkyl, in particular wherein the alkyl comprises from 6 to 20, even more specifically the alkyl phosphate salt is an alkyl PEG phosphate salt.

More specifically, the degree of ethoxylation of the alkyl group ranges between 1 and 10.

In particular, the anionic surfactant (b) is a decyl PEG-4 phosphate salt, more specifically a potassium deceth-4 phosphate.

One example of the commercial availability of the alkyl phosphates is "Phosphetal 201 K", which is also a commercial product from Zschimmer & Schwartz and is a mixture of mono- and disubstituted phosphoric acid by an alkyl alcohol. The alkyl alcohol component is in this case decyl PEG-4; said phosphates are in the form of the potassium salt. The name of this alkyl phosphate according to INCI nomenclature is: potassium deceth-4 phosphate.

Advantageously, the content of anionic surfactant (b) in the aqueous peelable ink composition of the disclosure ranges from 0.1 to 5% by weight, more advantageously from 0.2 to 3% by weight, and even more advantageously from 0.3 to 2% by weight, relative to the total weight of the ink composition.

The aqueous peelable ink composition of the present disclosure also comprises at least one coloring agent (c) which gives the color to the ink composition. The coloring agent (c) may be a dye and/or a pigment dispersion, or mixtures thereof.

The term "dyes" should be understood as meaning colored, mineral or organic particles of any form, which are soluble in the medium in which they are solubilized, and which are intended to color the ink composition once applied on a substrate after peeling. When the coloring agent (c) is a dye, it may be chosen for example in the group consisting of direct dyes (for example C.I direct black 17, 19, 22, 32, 38, 51, 71; C.I direct yellow 4, 26, 44, 50; C.I direct red 1, 4, 23, 31, 37, 39, 75, 80, 81, 83, 225, 226, 227; C.I direct blue 1, 15, 41, 71, 86, 87, 106, 108, 199, and the like), acid dyes (for example C.I acid black 1, 2, 24, 26, 31, 52, 107, 109, 110, 119, 154; C.I acid yellow 1, 7, 17, 19, 23, 25, 29, 38, 42, 49, 61, 72, 78, 110, 127, 135, 141, 142; C.I acid red 8, 9, 14, 18, 26, 27, 33, 35, 37, 51, 52, 57, 82, 83, 87, 92, 94, 111, 129, 131, 138, 186, 249, 254, 265, 276; C.I acid violet 15, 17, 49; C.I acid blue 1, 3, 7, 9, 15, 22, 23, 25, 40, 41, 43, 62, 78, 83, 90, 93, 100, 103, 104, 112, 113, 158; C.I acid green 3, 9, 16, 25, 27; C.I acid orange 56, and the like), food dyes (such as C.I. food yellow 3, and the like), Malachite green (C.I 4200), Victoria blue FB (C.I. 44045), methyl violet FN (C.I. 42535), rhodamine F4G (C.I. 45160), rhodamine 6GCP (C.I 45160), and mixtures thereof.

The term "pigment" should be understood as meaning white or colored, mineral or organic particles of any form, which are insoluble in the medium in which they are solubilized, and which are intended to color the ink composition once applied on a substrate before peeling. The pigments are also generally contained in a dispersion, where the grinding down or particle size reduction is accompanied by appropriate dispersants to achieve stable dispersions. When the coloring agent (c) is a pigment, it is advantageously a pigment dispersion. The pigment (c) may be chosen for example in the group consisting of pigment black 7 (such as Flexiverse III Black 7 by SunChemical®), pigment blue 15:3 (such as APE FRE BL 15:3 DISP 7 by SunChemical®), pigment red (such as Pigment Red 210 by SunChemical®), pigment green 7 (such as Sunspserse Eco Green, Flexiverse FD Green, Flexiverse Green 7, Flexiverse HC GRN 7 by SunChemical®), and mixtures thereof, more specifically the pigment dispersion is chosen in the group consisting of pigment black 7, pigment blue 15:3, and mixtures thereof.

According to a preferred embodiment, the particle size of the pigments in a pigment dispersion is less than 1 $\mu m$, and preferably less than 0.7 $\mu m$.

Advantageously, the content of coloring agent (c) ranges from 0.1 to 35% by weight, and preferably from 0.5 to 25% by weight, relative to the total weight of the ink composition. When the coloring agent (c) is a dye, the content of dye advantageously ranges from 0.1 to 10% by weight, and preferably from 2 to 6% by weight, relative to the total weight of the ink composition. When the coloring agent (c) is a pigment, the content of pigment advantageously ranges from 0.1 to 30% by weight, and preferably from 0.5 to 20% by weight, relative to the total weight of the ink composition.

The aqueous peelable ink composition of the disclosure also contains water (e) as the solvent.

Advantageously, the content of water (e) in the aqueous peelable ink composition of the disclosure ranges from 10 to 80% by weight, more advantageously from 10 to 70% by weight, and even more advantageously from 10 to 60% by weight, relative to the total weight of the ink composition.

The aqueous peelable ink composition of the disclosure may further comprise at least one plasticizer. The plasticizer is used to improve the flexibility of the film resulting from the drying of the aqueous peelable ink composition of the disclosure. The plasticizer of the disclosure is chosen in the group consisting of polyols, (poly)esters, and mixtures thereof, and preferably polyols in $C_2$-$C_{10}$, (poly)esters in $C_6$-$C_{32}$, and mixtures thereof. In a preferred embodiment, the plasticizer of the disclosure is chosen in the group consisting of saturated polyols in $C_2$-$C_6$, benzoate ester in $C_6$-$C_{24}$, diisobutyrate ester in $C_8$-$C_{24}$, and mixtures thereof. In a particularly preferred embodiment, the plasticizer of the disclosure is chosen in the group consisting of ethylene glycol, propylene glycol, butylene glycol, glycerin, trimethyl pentanyl diisobutyrate, and mixtures thereof, and more preferably the plasticizer of the disclosure is glycerin. According to a preferred embodiment, the aqueous peelable ink composition of the disclosure comprises as plasticizer a mixture of at least one (poly)ester and at least one alcohol, wherein the at least one alcohol has preferably a boiling point higher than 160° C., and more preferably is glycerin (boiling point: 290° C.).

Advantageously, the content of plasticizer in the aqueous peelable ink composition of the disclosure ranges from 1 to 25% by weight, and more advantageously from 8 to 20% by weight, relative to the total weight of the ink composition.

The aqueous peelable ink composition according to the present disclosure may further comprise additional additive (s) known by the skilled person to be usable in aqueous ink compositions, advantageously chosen in the group consisting of antimicrobial agents, antifungal agents, dispersing agents, wetting agents, pH regulators, and mixtures thereof.

Advantageously, the content of additional additive(s) in the ink composition of the disclosure ranges from 0.1 to 30% by weight, more advantageously from 0.1 to 20% by weight, and even more advantageously from 0.1 to 10% by weight, relative to the total weight of the ink composition.

The aqueous peelable ink composition of the disclosure may advantageously contain at least one antimicrobial agent such as methyl paraben, isothiazolinone, phenoxyethanol, 1,2-benzoisothiazolin-3-one, 2-methyl-4-isothiazolin-3-one, and mixtures thereof. Advantageously, the antimicrobial agent is present in the aqueous peelable ink composition of the disclosure in a content ranging from 0.1 to 5% by weight, and more advantageously from 0.1 to 2% by weight, relative to the total weight of the ink composition.

The aqueous peelable ink composition according to the present disclosure may also contain a pH regulator, preferably chosen in the group consisting of ammonia, urea, monoethanolamine, diethanolamine, triethanolamine, alkali metal salts of phosphoric acid such as tripolyphosphate, sodium carbonate and hydroxides of alkali metals such as sodium hydroxide.

The ink composition according to the present disclosure is peelable, advantageously by peeling such as by mechanical friction, in particular by the use of a finger or a friction body wherein the friction body is an eraser or a tissue. The ink composition of the disclosure is therefore peelable by the use of the heat generated by the friction of a finger or the eraser.

Advantageously, the eraser used as a friction body may be chosen in the group consisting of ethylene-propylene-diene monomer (EPDM) rubber, Vulcanized Thermoplastic Elastomer (TPV) which is a blend of ethylene-propylene-diene monomer (EPDM) rubber and polypropylene (PP), ethylene-propylene rubber (EPR), poly(styrene-butadiene-styrene) (SBS), styrene ethylene butylene styrene (SEBS), natural rubber (NR), polyisoprene (IR), polyvinyl chloride, styrene-based thermoplastic elastomers including styrene-butadiene-styrene (SBS), styrene-ethylene-butylene-styrene (SEBS), styrene-ethylene-propylene-styrene (SEPS), styrene-ethylene-ethylene-propylene-styrene (SEEPS), polyether based polyurethane (PTU), and mixtures thereof.

Advantageously, the tissue used as a friction body may be chosen in the group consisting of cotton fabric, synthetic fabric and leather fabric, and more advantageously cotton fabric.

The aqueous peelable ink composition according to the present disclosure has advantageously a viscosity of 3 to 10 mPa·s, and more advantageously of 3 to 7 mPa·s, measured at 20° C. with a Shell Cup #1 marketed by NORCROSS® Corporation. When the viscosity is less than 3 mPa·s, the pigment particles may settle more rapidly in the ink composition with a risk of ink leakage. Furthermore, when the viscosity is higher than 10 mPa·s, the flow rate of the ink composition is too low and any line was not written.

The aqueous peelable ink composition according to the present disclosure has advantageously a surface tension of between 20 and 50 mN·m$^{-1}$, more specifically of between 20 to 35 mN·m−1 and even more preferably of 23 to 32 mN·m$^{-1}$, measured at 20° C. by using a tensiometer, such as Krüss K11 from KRÜSS GmbH.

In a second aspect, the present disclosure relates to a method for preparing an aqueous peelable ink composition according to the disclosure, comprising the steps of:

(i) under stirring, adding at least one film-forming elastomeric polymer (a) to water (d), (ii) under stirring, adding at least one anionic surfactant (b), at least one coloring agent (c), and the optional at least one plasticizer, to the mixture obtained in step (i), and (iii) under stirring, adding the optional additive(s) to the mixture obtained in step (ii).

The film-forming elastomeric polymer (a), anionic surfactant (b), coloring agent (c), water (d), as well as the optional plasticizer and additive(s), are as defined above for the aqueous peelable ink composition according to the disclosure.

During steps (i), (ii), and (iii), the ink ingredients are mixed under stirring at room temperature (20° C.), advantageously at a stirring speed ranging from 200 to 700 rpm, and more advantageously at a stirring speed of 500 rpm.

The ink composition obtained in steps (i), (ii), and (iii), can be homogenized during a certain period of time ranging from 3 to 20 minutes, and preferably from 5 to 10 minutes.

In a thirst aspect, the present disclosure relates to a writing instrument, in particular a marker, containing an aqueous peelable ink composition according to the disclosure.

Advantageously, the writing instrument according to the present disclosure contains an eraser, in particular located on the cap or on the non-writing end of the writing instrument. More particularly, the eraser consists of ethylene-propylene-diene monomer (EPDM) rubber, Vulcanized Thermoplastic Elastomer (TPV) which is a blend of ethylene-propylene-diene monomer (EPDM) rubber and polypropylene (PP), ethylene-propylene rubber (EPR), poly(styrene-butadiene-styrene) (SBS), styrene ethylene butylene styrene (SEBS), natural rubber (NR), polyisoprene (IR), polyvinyl chloride, styrene-based thermoplastic elastomers including styrene-butadiene-styrene (SBS), styrene-ethylene-butylene-styrene (SEBS), styrene-ethylene-propylene-styrene (SEPS), styrene-ethylene-ethylene-propylene-styrene (SEEPS), polyether based polyurethane (PTU), and mixtures thereof.

According to a preferred embodiment, the writing instrument according to the present disclosure comprises:

an axial barrel containing an aqueous peelable ink composition according to the disclosure, and a pen body which delivers the aqueous peelable ink composition stored in the axial barrel.

In a fourth aspect, the present disclosure relates to a method for writing on a substrate, in particular on a non-porous substrate, comprising the step of applying an ink composition according to the disclosure on a substrate, preferably chosen in the group consisting of glass, metals which may be pre-treated or not and chosen in the group consisting of aluminum, stainless steel, zinc, tin, and mixtures thereof, and polymer materials chosen in the group consisting of polyethylene, polypropylene, polyvinyl chloride, and mixtures thereof, and more preferably chosen in the group consisting of glass, aluminum, and polymer materials such as polyethylene and polypropylene.

In a fifth aspect, the present disclosure further concerns a film obtained by drying an ink composition according to the disclosure, but exempt of water, said film comprising:

(a) at least one film-forming elastomeric polymer, (b) at least one anionic surfactant, and (c) at least one coloring agent, wherein the film-forming elastomeric polymer (a) is acrylonitrile butadiene rubber (NBR) and/or hydrogenated acrylonitrile butadiene rubber (HNBR).

The film-forming elastomeric polymer (a), anionic surfactant (b), and coloring agent (c), that constitute the film according to the disclosure, are as defined above for the aqueous peelable ink composition of the disclosure.

The film of the disclosure may also comprise plasticizer and additive(s), as defined above for the aqueous peelable ink composition according to the disclosure.

In a preferred embodiment, the thickness of the film of the disclosure is of 1 to 10 μm, and preferably of 2 to 6 μm, before drying.

In a specific embodiment, the film of the disclosure may be obtained according to a method comprising the step of drying an ink composition according to the disclosure, at a temperature ranging from 0 to 40° C., and preferably at a temperature ranging from 15 to 30° C.

Finally, the present disclosure relates to a substrate, in particular a non-porous, coated with an aqueous peelable ink composition according to the present disclosure or a film according to the present disclosure. For the purposes of the present disclosure, the term "non-porous substrate" is intended to mean any substrate that does not contain any pore or empty space. The non-porous substrates have no pore or empty space that allows external matter, like ink, to penetrate into the substrate. In a preferred embodiment, the substrate is chosen in the group consisting of glass, metals which may be pre-treated or not and chosen in the group consisting of aluminum, stainless steel, zinc, tin, and mixtures thereof, and polymer materials chosen in the group consisting of polyethylene, polypropylene, polyvinyl chloride, and mixtures thereof. In a particularly preferred embodiment, the substrate is chosen in the group consisting of glass, aluminum, and polymer materials such as polyethylene and polypropylene.

In a specific embodiment, the substrate of the disclosure, in particular the non-porous substrate, is coated with a film made of an aqueous peelable ink composition according to the disclosure having a thickness of 1 to 10 μm, and preferably of 2 to 6 μm, before drying. In a specific embodiment, the substrate of the disclosure is coated with a film made of an aqueous peelable ink composition according to the disclosure having a thickness of 0.5 to 5 μm, and preferably of 1 to 3 μm, after 5 minutes of drying at room temperature (20° C.).

In addition to the foregoing, the disclosure also comprises other provisions which will emerge from the additional description which follows, which relates to the preparation of aqueous peelable ink compositions according to the present disclosure and comparative examples.

EXAMPLES

Example 1: Preparation of a Black Aqueous Peelable Ink Composition According to the Disclosure An aqueous peelable ink composition according to the present disclosure comprising the ink ingredients of Table 1 was prepared.

TABLE 1

| Trade name | Chemical name | % by weight |
|---|---|---|
| Water | | 28.75% |
| Zetpol ® 2230LX | HNBR (dry extract: 40.5%) | 55% (22% of pure HNBR) |
| Glycerin 4810 | | 5.0% |
| Hydropalat WE 3488 | Anionic surfactant (sodium 1,4-diisodecylsulphonatosuccinate) (dry extract: 50%) | 0.75% (0.38% of pure surfactant) |
| Acticide PHE | Phenoxyethanol | 0.50% |
| Flexiverse Black 7 | Pigment dispersion | 10.0% |
| Total | | 100% |

For a preparation of 1 kg, 287.5 g of water were introduced at room temperature in a dissolver DISPERMAT® LC75 (dissolver disc Ø 60 mm). Then, 550 g of Zetpol® 2230LX (Zeon corporation) were added at the same stirring speed. The % of solid HNBR in Zetpol® 2230LX (Zeon corporation) represents 40.5% (dry extract), and the % of solid HNBR in the final ink composition is thus of 22% by weight. After 5 minutes, 50 g of glycerin were slowly introduced. After 5 minutes under the same stirring speed, 7.5 g of Hydropalat WE 3488 were added. After 5 minutes under the same stirring speed, 100 g of a black pigmented dispersion Flexiverse III Black were added. The mixture was stirred for 5 minutes more. Then, 5 g of Acticide PHE were added, and the mixture was stirred for 5 minutes more to obtain the final ink composition.

The viscosity of the aqueous peelable ink composition (example 1) was measured at 20° C. with a Shell Cup #1 marketed by NORCROSS® Corporation, according to the following procedure:

1. Dip the shell cup in the ink until the cup is completely filled with ink.
2. Take the shell cup out of the fluid and start the timer simultaneously.
3. Stop the timer as soon as the fluid does not flow out any more. The time displayed on timer is reported as the shell cup viscosity at 20° C. of the fluid.
4. Clean and dry the shell cup.
5. Repeat steps 1 to 5 with the same fluid 2 times.
6. Report the average viscosity of the 3 measures.
7. Store the shell cup at room temperature.

The viscosity of the aqueous peelable ink composition of example 1 measured according to this procedure was: 4.7 mPa·s.

The surface tension of the aqueous peelable ink composition (example 1) was measured at 20° C., according to the following procedure:

1. Pour the sample in the crystallizer (3/4) and place it in the basis of tensiometer, such as Kruss K 11 provided by KRÜSS GmbH.
2. By using the wheel, bring the blade in contact with the sample to be tested, avoiding that the blade touches the sample (lower part of the blade being at 0.5 mm of the ink surface).
3. Start the automatic measurement of surface tension The surface tension of the aqueous peelable ink composition of example 1 measured according to this procedure was 27.28 mN·m$^{-1}$ The pH of the aqueous peelable ink composition (example 1) was measured at 20° C., according to the following procedure:

1. Calibrate the pH-meter (such as Toledo Seven Compact pH-meter) with buffer solutions at pH=2.0, pH=4.0, pH=7.0, pH=9.0 and pH=11.0.
2. Put the electrode of the pH-meter into the ink composition.
3. Start the automatic measurement of pH.

The pH of the aqueous peelable ink composition of example 1 measured according to this procedure was 9.22.

Example 2: Preparation of a Black Aqueous Peelable Ink Composition According to the Disclosure An aqueous peelable ink composition according to the present disclosure comprising the ink ingredients of Table 2 was prepared.

TABLE 2

| Trade name | Chemical name | % by weight |
|---|---|---|
| Water | | 50.75% |
| Nipol ® LX 531B | NBR (dry extract: 66%) | 33% (22% of pure NBR) |
| Glycerin 4810 | | 5.0% |
| Hydropalat WE 3488 | Anionic surfactant (sodium 1,4-diisodecylsulphonatosuccinate) (dry extract: 50%) | 0.75% (0.38% of pure surfactant) |
| Acticide PHE | Phenoxyethanol | 0.50% |
| Flexiverse III Black 7 | Pigment dispersion | 10.0% |
| Total | | 100% |

For a preparation of 1 kg, 507.5 g of water were introduced at room temperature in a dissolver DISPERMAT® LC75 (dissolver disc Ø 60 mm). Then, 330 g of Zetpol® 2230LX (Zeon corporation) were added at the same stirring speed. The % of solid NBR in Nipol® LX 531B (Zeon corporation) represents 66% (dry extract), and the % of solid NBR in the final ink composition is thus of 22% by weight. After 5 minutes, 50 g of glycerin were slowly introduced. After 5 minutes under the same stirring speed, 7.5 g of Hydropalat WE 3488 were added. After 5 minutes under the same stirring speed, 100 g of a black pigmented dispersion Flexiverse III Black were added. The mixture was stirred for 5 minutes more. Then, 5 g of Acticide PHE were added, and the mixture was stirred for 5 minutes more to obtain the final ink composition.

The viscosity of the aqueous peelable ink composition was measured at 20° C. with a Shell Cup #1 marketed by NORCROSS® Corporation, according to the same procedure as described in example 1.

The viscosity of the aqueous peelable ink composition of example 2 measured according to this procedure was: 3.9 mPa·s.

The surface tension of the aqueous peelable ink compositions was measured according to the same procedure as described in example 1.

The surface tension of the aqueous peelable ink composition of example 2 measured according to this procedure was 28.50 mN·m⁻¹

The pH of the aqueous peelable ink composition was measured according to the same procedure as described in example 1.

The pH of the aqueous peelable ink composition of example 2 measured according to this procedure was 9.39.

Example 3: Preparation of a Black Aqueous Peelable Ink Composition According to the Disclosure An aqueous peelable ink composition according to the present disclosure comprising the ink ingredients of Table 3 was prepared.

TABLE 3

| Trade name | Chemical name | % by weight |
|---|---|---|
| Water | | 28.75% |
| Zetpol ® 2230LX | HNBR (dry extract: 40.5%) | 55% (22% of pure HNBR) |
| Glycerin 4810 | | 5.0% |
| Phosfetal 201 K | Anionic surfactant (potassium deceth-4 phosphate) (dry extract: 90%) | 0.75% (0.68% of pure surfactant) |
| Acticide PHE | Phenoxyethanol | 0.50% |
| Flexiverse III Black 7 | Pigment dispersion | 10.0% |
| Total | | 100% |

For a preparation of 1 kg, 287.5 g of water were introduced at room temperature in a dissolver DISPERMAT® LC75 (dissolver disc Ø 60 mm). Then, 550 g of Zetpol® 2230LX (Zeon corporation) were added at the same stirring speed. The % of solid HNBR in Zetpol® 2230LX (Zeon corporation) represents 40.5% (dry extract), and the % of solid NBR in the final ink composition is thus of 22% by weight. After 5 minutes, 50 g of glycerin were slowly introduced. After 5 minutes under the same stirring speed, 7.5 g of Phosfetal 201K (Zschimmer & Schwarz) were added. After 5 minutes under the same stirring speed, 100 g of a black pigmented dispersion Flexiverse III Black were added. The mixture was stirred for 5 minutes more. Then, 5 g of Acticide PHE were added, and the mixture was stirred for 5 minutes more to obtain the final ink composition.

The viscosity of the aqueous peelable ink composition was measured at 20° C. with a Shell Cup #1 marketed by NORCROSS® Corporation, according to the same procedure as described in example 1.

The viscosity of the aqueous peelable ink composition of example 3 measured according to this procedure was: 4.4 mPa·s.

The surface tension of the aqueous peelable ink compositions was measured according to the same procedure as described in example 1.

The surface tension of the aqueous peelable ink composition of example 3 measured according to this procedure was 29.68 mN·m⁻¹

The pH of the aqueous peelable ink composition was measured according to the same procedure as described in example 1.

The pH of the aqueous peelable ink composition of example 3 measured according to this procedure was 9.11.

Example 4: Preparation of a Comparative Aqueous Peelable Ink Composition

A comparative aqueous peelable ink composition comprising the ink ingredients of Table 4 was prepared.

TABLE 4

| Trade name | Chemical name | % by weight |
|---|---|---|
| Water | | 29.50% |
| Zetpol ® 2230LX | HNBR (dry extract: 40.5%) | 55% (22% of pure HNBR) |
| Glycerin 4810 | | 5.0% |
| Acticide PHE | Phenoxyethanol | 0.50% |
| Flexiverse III Black 7 | Pigment dispersion | 10.0% |
| Total | | 100% |

For a preparation of 1 kg, 295.0 g of water were introduced at room temperature in a dissolver DISPERMAT® LC75 (dissolver disc Ø 60 mm). Then, 550 g of Zetpol® 2230LX (Zeon corporation) were added at the same stirring speed. The % of solid HNBR in Zetpol® 2230LX (Zeon corporation) represents 40.5% (dry extract), and the % of solid NBR in the final ink composition is thus of 22% by weight. After 5 minutes, 50 g of glycerin were slowly introduced. After 5 minutes under the same stirring speed, 100 g of a black pigmented dispersion Flexiverse III Black were added. The mixture was stirred for 5 minutes more. Then, 5 g of Acticide PHE were added, and the mixture was stirred for 5 minutes more to obtain the final ink composition.

The viscosity of the aqueous peelable ink composition was measured at 20° C. with a Shell Cup #1 marketed by NORCROSS® Corporation, according to the same procedure as described in example 1.

The viscosity of the aqueous peelable ink composition of example 4 measured according to this procedure was: 4.4 mPa·s.

The surface tension of the comparative aqueous peelable ink compositions was measured according to the same procedure as described in example 1.

The surface tension of the aqueous comparative peelable ink composition of example 4 measured according to this procedure was 32.65 mN·m⁻¹

The pH of the comparative aqueous peelable ink composition was measured according to the same procedure as described in example 1.

The pH of the comparative aqueous peelable ink composition of example 4 measured according to this procedure was 9.18.

Example 5: Wettability, Peelability and Leakage Performances of the Prepared Aqueous Ink Composition Wettability Performance: Evaluation of Wettability The wettability of a written mark made with an ink composition by applying it on a non-porous substrate (such as aluminium, glass, material based on polypropylene, material based on polyethylene) was assessed by using the following method at 23° C. and 50% relative humidity, and then evaluated by visual assessment.

The method is as followed:

Loops were drawn with a pen on the non-porous substrate and awaiting 5 minutes, the wettability of the ink composition was assessed before peeling by visual assessment.

The scoring (wettability performance) is defined as follows:

10: The wettability of the ink composition after applying it on the non-porous substrate is very good. The written mark is homogeneous, uniform and non-shrinkable.

0: The wettability of the ink composition after applying on the non-porous substrate is not good. The written mark is not homogeneous, not uniform, and the written mark retracts from the non-porous surface.

The results are indicated in Table 5 below.

TABLE 5

Comparison of the wettability performances of
the ink composition of the disclosure (examples 1, 2, 3)
with the comparative ink composition (example 4)

| Non-porous substrates | Ink composition of example 1 (disclosure) | Ink composition of example 2 (disclosure) | Ink composition of example 3 (disclosure) | Ink composition of example 4 (comparative example) |
|---|---|---|---|---|
| Glass | 7 | 4 | 7 | 2 |
| Material based on polypropylene | 7 | 3.5 | 5 | 1.5 |
| Material based on polyethylene | 7 | 3.5 | 5.5 | 2.5 |
| Average | 7 | 3.6 | 5.8 | 2 |

As shown in Table 5, the written marks made with the ink compositions according to the disclosure (examples 1, 2, 3) exhibit good results in terms of wettability performance, before peeling. Comparatively, the written mark made with the comparative ink composition of example 4 has a poor wettability, as shown by the very low wetting value, whatever the non-porous substrate.

Erasability Performance: Measurement of Peelability

The peelability (erasing efficiency) is the ability of an eraser to peel correctly a written mark made on a non-porous substrate (here aluminium), and assessed according to the following method at 23° C. and 50% relative humidity.

The written mark was peeled (or rubbed) with an eraser (here a tissue or a polyether based polyurethane (PTU) eraser), just after writing (approximately 5 minutes after writing), to peel the color of the written mark.

The method is as follows:

Loops were drawn with a pen on the non-porous substrate (aluminium), and then peeled in one time back and forth.

The scoring (i.e. the peeling efficiency) is defined as follows:

10: Erasability by peeling of the written mark is very efficient (no remaining written mark).

0: Erasability by peeling of the written mark is not efficient (remaining written marks).

The results are indicated in Table 6 below.

TABLE 6

Comparison of the erasability (disclosure)
performances of the ink compositions (examples 1, 2 and 3)
with the comparative ink composition (example 4)

| | Ink composition of example 1 (disclosure) | Ink composition of example 2 (disclosure) | Ink composition of example 3 (disclosure) | Ink composition of example 4 (comparative example) |
|---|---|---|---|---|
| Tissue | 6.5 | 6 | 5 | 4.5 |
| Polyether based polyurethane (PTU) eraser | 4.5 | 7.5 | 5 | 4 |
| Average | 5.5 | 6.75 | 5 | 4.2 |

As shown in Table 6, the written mark of the ink compositions of the disclosure (examples 1, 2, 3) exhibit good results in terms of erasing efficiency (peelability) of the written mark, whatever the non-porous substrate.

Comparatively, the written mark obtained with the comparative ink composition of example 4 cannot be peeled correctly, as shown by its low erasing efficiency value, whatever the non-porous substrate.

Hence, the written mark made with the ink compositions of the disclosure (examples 1, 2, 3) exhibit a good wettability in combination with a good erasability, contrary to the written mark made with ink composition without anionic surfactant (example 4).

In addition, it has been observed that the intensity (vividness) of the written mark of the ink compositions of the disclosure (examples 1, 2, 3) after applying on non-porous substrates is satisfactory, whatever the non-porous substrate.

Example 6: Preparation of a Comparative Aqueous Peelable Ink Composition

A comparative aqueous peelable ink composition comprising the ink ingredients of Table 7 was prepared.

TABLE 7

| Trade name | Chemical name | % by weight |
|---|---|---|
| Water | | 28.10% |
| Zetpol ® 2230LX | HNBR (dry extract: 40.5%) | 55% (22% of pure HNBR) |
| Glycerin 4810 | | 5.0% |
| Capstone FS-50 | Amphoteric surfactant (Betaine partially fluorinated surfactant) (dry extract: 27%) | 1.40% (0.38% of pure surfactant) |
| Acticide PHE | Phenoxyethanol | 0.50% |
| Flexiverse Black 7 | Pigment dispersion | 10.0% |
| Total | | 100% |

For a preparation of 1 kg, 281.0 g of water were introduced at room temperature in a dissolver DISPERMAT® LC75 (dissolver disc Ø 60 mm). Then, 550 g of Zetpol® 2230LX (Zeon corporation) were added at the same stirring speed. The % of solid HNBR in Zetpol® 2230LX (Zeon corporation) represents 40.5% (dry extract), and the % of solid HNBR in the final ink composition is thus of 22% by weight. After 5 minutes, 50 g of glycerin were slowly introduced. After 5 minutes under the same stirring speed, 14 g of Capstone FS-50 were added. After 5 minutes under the same stirring speed, 100 g of a black pigmented dispersion Flexiverse III Black were added. The mixture was stirred for 5 minutes more. Then, 5 g of Acticide PHE were added, and the mixture was stirred for 5 minutes more to obtain the final ink composition.

The viscosity of the comparative aqueous peelable ink composition of example 6, was measured according to the above described method as for example 1, and is of 5.07 mPa·s.

The surface tension of the comparative aqueous peelable ink composition of example 6 was measured according to the above described method as for example 1, and is of 17.69 mN·m$^{-1}$ The pH of the comparative aqueous peelable ink composition was measured according to the same procedure as described in example 1.

The pH of the comparative aqueous peelable ink composition of example 6 measured according to this procedure was 9.52.

Comparative Evaluation of Performance of Aqueous Ink Composition of Example 1 and Comparative Aqueous Ink Composition of Example 6.

The wettability and peelability performances are good and similar as for the ink composition of example 1 (disclosure) and with the ink composition of example 6 (comparative example). In addition, the ink leakage performances have been evaluated according to the below experimental protocols.

Drop Test with Nib Downwards:

The following test enabled to evaluate the leakage of a writing instrument having its nib pointing downwards and dropped vertically from a desk onto a hard floor.

Equipment:

Writing instruments filled either with the ink composition of example 1 (disclosure) or with the ink composition of example 6 (comparative example).

Rigid PVC tube 1 meter with a diameter of 4 cm.

Horizontal support (hard floor)

The process is carried out as follows (test on 10 pens):

1. Use the drop test system (rigid PVC tube) wherein the writing instrument is introduced with the nib pointing downwards with its cap into the drop tube so that the cap of the writing instrument is about 1 meter distance away from the horizontal support.

2. Let the writing instrument drop freely in the drop test system.

3. Remove the cap after the drop test and visually observe if a leakage occurred at the surface of the nib or into the cap.

It has been observed that no leakage phenomenon appeared at the surface of the nib or into the cap of the writing instrument comprising the ink composition of example 1 which comprises an anionic surfactant (disclosure), whereas leakage phenomenon (visible drop) appeared at the surface of the nib or into the cap of the writing instrument comprising the comparative ink composition of example 6 which comprises an amphoteric surfactant.

Leakage with Nib Downwards:

The following test enabled to measure the amount of ink leaking from the nib of a writing instrument when stored with the nib pointing downwards during one day at 50° C., as well as during one day at 40° C.

The process is carried out as follows (test on 10 pens):

1. Start up of the writing instrument (by writing with the writing instrument)

2. Wipe the nib with non fluffy paper to remove potential excess of ink from surface.

3. Store the writing instrument during 24 hours with the nib pointing down at 50° C.

4. Store the writing instrument during 2 hours with the nib pointing down at ambient temperature.

5. Remove the cap of the writing instrument.

6. Introduce a cotton bud into the cap of the writing instrument and check if a drop has been formed into the cap.

The same method of evaluation has been performed by implementing step 3 at 40° C. instead of 50° C.

It has been observed that no leakage phenomenon appeared for the writing instrument comprising the ink composition of example 1 which comprises an anionic surfactant (disclosure), whereas leakage phenomenon (visible drop) appeared into the cap comprising the comparative ink composition of example 6 which comprises an amphoteric surfactant. The same result has been obtained by implementing step 3 at 40° C. instead of 50° C.

The invention claimed is:

1. An ink composition comprising:
   (a) at least one film-forming elastomeric polymer,
   (b) at least one anionic surfactant,
   (c) at least one coloring agent, and
   (d) water,
   wherein the at least one film-forming elastomeric polymer includes hydrogenated acrylonitrile butadiene rubber (HNBR).

2. The ink composition according to claim 1, wherein the ink composition further comprises at least one plasticizer, wherein the at least one plasticizer is selected from the group consisting of polyols, (poly)esters, and mixtures thereof.

3. The ink composition according to claim 2, wherein the at least one plasticizer is selected from the group consisting of ethylene glycol, propylene glycol, butylene glycol, glycerin, trimethyl pentanyl diisobutyrate, and mixtures thereof.

4. The ink composition according to claim 1, wherein the at least one anionic surfactant is a salt of fatty acid esters, of sulfonic acid, of phosphoric acid, or a combination thereof.

5. The ink composition according to claim 4, wherein the at least one anionic surfactant is an alkali metal salt of 1,4-diisodecyl sulphonatosuccinate or of deceth-4 phosphate.

6. The ink composition according to claim 5, wherein the at least one anionic surfactant is sodium 1,4-diisodecyl sulphonatosuccinate or potassium deceth-4 phosphate.

7. The ink composition according to claim 4, wherein a content of the at least one anionic surfactant ranges from 0.3% to 2% by weight, relative to a total weight of the ink composition, and wherein anionic surfactant includes a salt of sulfonic acid.

8. The ink composition according to claim 1, wherein the at least one coloring agent is a pigment dispersion, and wherein a content of the at least one coloring agent ranges from 0.1% to 35% by weight, relative to a total weight of the ink composition.

9. The ink composition according to claim 1, wherein a content of the at lest one film-forming elastomeric polymer represents at least 8% by weight, relative to a total weight of the ink composition.

10. The ink composition according to claim 1, wherein a content of the at least one anionic surfactant ranges from 0.1 to 5% by weight, relative to a total weight of the ink composition.

11. The ink composition according to claim 10, wherein a content of the at least one anionic surfactant ranges from 0.3% to 2% by weight, relative to the total weight of the ink composition.

12. The ink composition according to claim 1, wherein a content of water ranges from 10% to 80% by weight, relative to a total weight of the ink composition.

13. The ink composition according to claim 1, wherein a content of the at least one plasticizer ranges from 1% to 25% by weight, relative to a total weight of the ink composition.

14. The ink composition according to claim 1, wherein the ink composition further comprises at least one additive selected from the group consisting of antimicrobial agents, antifungal agents, dispersing agents, wetting agents, pH regulators, and mixtures thereof.

15. The ink composition according to claim 1, wherein the ink composition is configured to form a written mark that is erasable.

16. A method for preparing the ink composition according to claim 1, comprising the steps of:

(i) under stirring, adding the at least one film-forming elastomeric polymer to water, (ii) under stirring, adding the at least one anionic surfactant, the at least one coloring agent, and at least one plasticizer, to a mixture obtained in step (i), and (iii) under stirring, adding additive(s) to a mixture obtained in step (ii).

17. A writing instrument containing the ink composition according to claim 1, wherein the writing instrument is a marker, wherein the writing instrument comprises an eraser located on a cap or on a non-writing end of the writing instrument.

18. A method for writing on a non-porous substrate, comprising the step of applying the ink composition according to claim 1 on a non-porous substrate, selected from the group consisting of glass, metals selected from the group consisting of aluminum, stainless steel, zinc, tin, and mixtures thereof, and polymer materials selected from the group consisting of polyethylene, polypropylene, polyvinyl chloride, and mixtures thereof to form a writing, and erasing by peeling the writing with a finger or with a friction body, wherein the friction body is an eraser or a tissue.

19. A film obtained by drying the ink composition according to claim 1, wherein the film comprises:

the at least one film-forming elastomeric polymer, the at least one anionic surfactant, and the at least one coloring agent.

20. A non-porous substrate coated with the ink composition according to claim 1, wherein the non-porous substrate is selected from the group consisting of glass, metals selected from the group consisting of aluminum, stainless steel, zinc, tin, and mixtures thereof, and polymer materials selected from the group consisting of polyethylene, polypropylene, polyvinyl chloride, and mixtures thereof.

\* \* \* \* \*